Jan. 25, 1927.

E. F. LEWIS

PLANT PROTECTOR

Filed July 26, 1926

1,615,589

Inventor
E. F. LEWIS,
By
Attorney

Patented Jan. 25, 1927.

1,615,589

UNITED STATES PATENT OFFICE.

ERNEST F. LEWIS, OF CAMBRIDGE, IOWA, ASSIGNOR TO VIOLA LEWIS, OF CAMBRIDGE, IOWA.

PLANT PROTECTOR.

Application filed July 26, 1926. Serial No. 124,896.

My invention relates to plant protectors.

In accordance with my invention, I provide a device for surrounding or covering the plant, and which is adapted to be forced into the ground a suitable distance, preventing cut-worms or the like from gaining access to the plant. The device is also provided with a preferably conical foraminous top, preventing insects from having access to the plant and permitting the plant being watered without the removal of the protector. The conical top preferably extends into the body portion, at its top, so that when the plant is being sprinkled the water will fall entirely within the protector, in proximity to the plant. The conical top is also adapted to be covered by an imperforate shield in the event that it is desired to protect the plant from cold, or frost, or excessive sunlight. The shield is preferably slightly shorter than the conical top so that in the event that it should rain while the shield is in place the water may readily pass to the interior of the device, in proximity to the plant.

Other objects and advantages of the invention will be apparent during the course of the following description.

In the accompanying drawings, forming a part of this specification, and in which like numerals are employed to designate like parts throughout the same.

Figure 1:
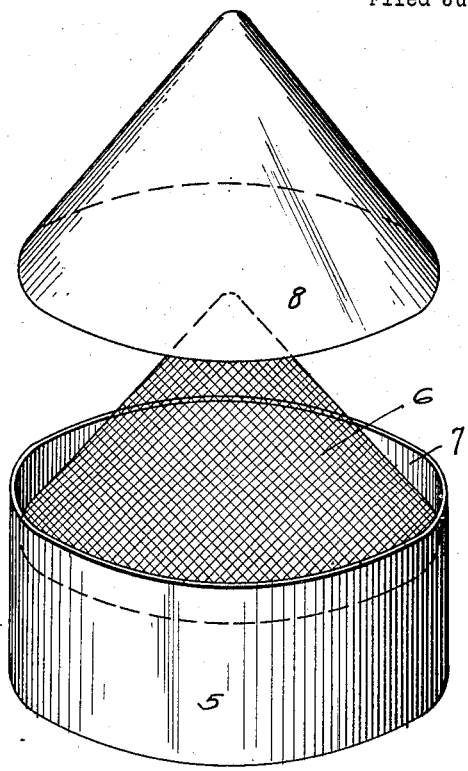
Figure 2:
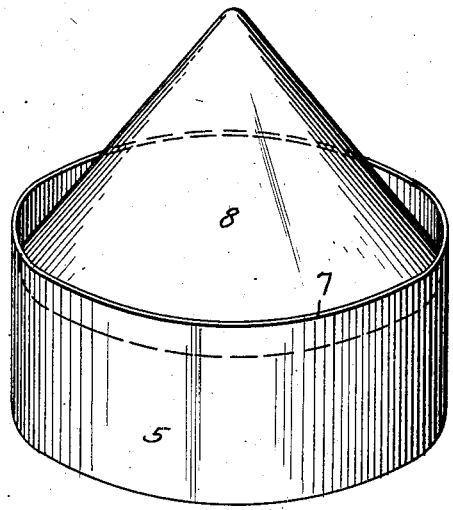
Figure 3:
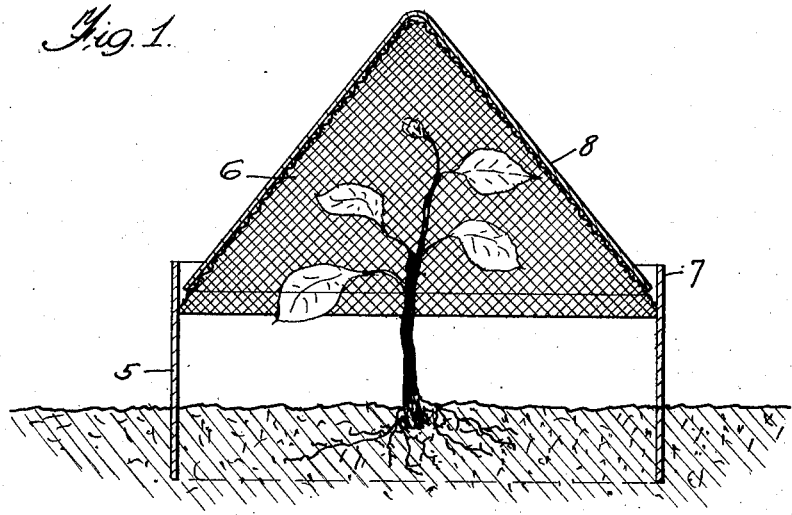

Figure 1 is a perspective view of a plant protector embodying my invention, showing the shield removed, Figure 2 is a similar view showing the shield in place, and Figure 3 is a central vertical section through the device.

In the drawings, wherein for the purpose of illustration is shown a preferred embodiment of my invention, the numeral 5 designates a casing or body portion, which is preferably cylindrical and preferably formed of galvanized sheet metal, or any other suitable material. This casing is open at its top and bottom.

The numeral 6 designates a tapered or conical top, formed of foraminous material, such as wire gauze. This conical top increases in diameter downwardly and its large end is inserted within the top of the casing 5, at an elevation beneath the top of the casing, affording a flange or shoulder 7. The top 6 and casing 5 are soldered or otherwise rigidly attached.

The numeral 8 designates a guard or shield, formed of imperforate material, such as waxed paper, sheet metal, or the like. This guard or shield is tapered or conical and increased in diameter downwardly and is adapted to fit upon the top 6 and this guard is slightly shorter than the top 6, so that its lower end 9 is spaced from the casing 5. The function of this arrangement is to provide means for the passage of rain or the like, which may fall upon the guard or shield, whereby the rain may enter the casing 5 in proximity to the plant.

In the use of the device, the casing 5 is forced into the ground a suitable distance around the plant. This will protect the plant from attack by cut-worms or the like, and the top 6 will protect the plant from insects. The plant may be watered without removing the protector, as the water may be sprinkled upon the foraminous top 6, and the water will freely pass through its top to the interior of the casing 5, and the water which runs down the top will be caught by the flange 7 and directed into the casing 5, in proximity to the plant. When it is desired to protect the plant from frost or very excessive sunlight, the guard or shield 8 is placed upon the conical top 6. Should it rain, while this guard is in position, the water will run down the guard 8 and enter the interior of the casing 5, in proximity to the plant.

It is to be understood that the form of my invention, herewith shown and described, is to be taken as a preferred example of the same, and that various changes in the shape, size and arrangement of parts may be resorted to without departing from the spirit of my invention, or the scope of the subjoined claims.

Having thus described my invention, I claim:

1. A plant protector comprising a casing to surround the plant, and a tapered foraminous top secured to the upper portion of the casing with the casing extending outwardly of and above the bottom of the tapered top forming a flange to direct the water into the casing.

2. A plant protector comprising a casing to surround the plant, a tapered foraminous top mounted within the upper portion of the casing below the top of the casing whereby such casing extends above the bottom of the top and forms a flange to guide the water into the casing, and a tapered imperforate guard to be mounted upon the tapered top, said guard being shorter than the top whereby the lower portion of the top is left uncovered.

In testimony whereof I affix my signature.

ERNEST F. LEWIS.